Oct. 4, 1966     J. T. DUNTON     3,276,792

SELF-SEALING GASKET FOR PIPE JOINTS

Original Filed July 9, 1962     2 Sheets-Sheet 1

INVENTOR.
JOHN T. DUNTON
BY

ATTORNEY.

Oct. 4, 1966   J. T. DUNTON   3,276,792
SELF-SEALING GASKET FOR PIPE JOINTS
Original Filed July 9, 1962   2 Sheets-Sheet 2

INVENTOR.
JOHN T. DUNTON
BY

ATTORNEY.

3,276,792
SELF-SEALING GASKET FOR PIPE JOINTS
John T. Dunton, Bradford, Pa., assignor to Dresser Industries Inc., Dallas, Tex., a corporation of Delaware
Continuation of application Ser. No. 208,322, July 9, 1962. This application Jan. 11, 1965, Ser. No. 425,688
3 Claims. (Cl. 285—109)

This application is a continuation of my co-pending application Serial No. 208,322, filed July 9, 1962 and now abandoned.

The present invention relates to those gaskets which are included as an element of a pipe joint and is concerned primarily with a gasket of the so-called self sealing type.

The objects and advantages of the present invention will be explained in conjunction with one type of coupling for light wall pipe. However, it is to be clearly understood that neither the coupling nor the pipe are a limitation on the invention.

In a pipe coupling including a self sealing gasket of the type with which this invention is concerned, pressure of the line content forces the gasket into sealing engagement with the bore of the pipe. However, if this pressure is to be effective in the manner intended it is of the utmost importance that none of the line content get in behind the gasket. That is, there should be no line content between the gasket and the bore of the pipe. If this should occur, the pressure of the line content will be neutralized and the sealing effect lost.

Because of this it has been recognized that an initial seal between the gasket and the pipe bore is of importance. However, the initial seals heretofore provided have been in the natural of a line contact which presents a strong possibility that this initial seal wil be impaired. Moreover, any gaskets which have provided for a surface contact with the pipe bore have done so only with a pressure that has proven to be inadequate.

With the foregoing conditions in mind, the present invention has in view as its foremost objective the provision, in a pipe coupling, of a self sealing gasket which includes means which definitely assures of an initial seal that is characterized by an area contact over an appreciable cylindrical surface and under substantial and adequate pressure. This initial seal is established as the pipe joint is assembled and is entirely independent of the pressure of the line content. It is later emphasized and strengthened by the pressure of the line content.

One type of pipe joint which utilizes a self sealing gasket is such as that illustrated in the co-pending application of Frederick T. Newell et al., Serial #94,831, filed March 10, 1961, now abandoned, for "Coupling for Light Wall Pipe," and refiled as a continuation-in-part on September 9, 1964, Serial No. 396,474, now abandoned. In a pipe joint of this type a gasket is employed and this gasket includes a central rib or flange which is interposed between the meeting pipe ends. Extending axially outwardly from the opposite sides of this flange are two flared extensions each of which fits into one of the meeting pipe ends. Prior to assembly each of these extensions has a maximum outside diameter that is greater than the bore of the pipe into which it is to be inserted. Thus, the insertion entails the compression of the flared extension which results in the initial seal above mentioned. However, in the joint of the above identified co-pending application and in other known joints there is nothing to hold the central portion of the gasket against radial collapse or compression with the ultimate result that the initial seal is a line contact rather than an area contact, and even if some measure of a surface contact, is obtained, the radial outward pressure generated by the gasket is inadequate to achieve the initial seal required.

With these conditions in mind, a further highly important object of the invention is to provide a self sealing gasket of the character aforesaid which includes a central portion having an external rib or flange that is intended to be inserted between meeting pipe ends together with mechanical means for maintaining this central portion at a predetermined diameter against the influence from a compression of the flared extensions. This results in the generation of an outward radial pressure by extensions as they are compressed for pipe insertion purposes and this pressure has no component directed away from the meeting ends. Any component, other than radial, which is generated, will be towards the meeting ends.

More in detail the invention has as an object, the provision of a self sealing gasket of the character indicated in which the central flange is of rubber or a comparable elastomer material and is integrally joined to the flared extensions. Mechanically bonded and interlocking with this central flange is a metallic ring. This ring serves to maintain that portion of the gasket immediately contiguous to the flange to the diameter of the pipe bore. Thus, as the flared extensions are compressed and contracted as they are inserted into the pipe bore, the central portion of the gasket does not collapse and in effect, provides an additional compressive force on those portions of the gasket in contact with the pipe bore. This surface contact provides the initial seal under high pressure which is of such importance in a self sealing gasket of this type.

Still more in detail the invention has as an object, the provision of a self sealing gasket of the type indicated in which a metallic ring is formed with a series of apertures and is molded or vulcanized into the central flange. As this is done, the rubber material of the flange passes through the apertures and establishes the mechanical bond or interlock above mentioned.

Still another object in view is to provide a self sealing gasket of the character aforesaid in which each end of each flared extension is formed as an inwardly tapering conical surface. This surface facilitates insertion into the bore of the pipe.

Vairous other more detailed objects and advantages of the invention such as arise in connection with carrying out the above noted ideas in a practical embodiment will in part become apparent and in part be hereinafter stated as a description of the invention proceeds.

The invention therefore comprises a self sealing gasket for a pipe joint which is characterized as including a central portion having an external flange with a metallic ring associated therewith for maintaining this central portion a predetermined diameter which is the bore of the pipe into which the flared extensions of the gasket are to be inserted whereby maximum outward radial pressure is created in these extensions.

For a full and more complete understanding of the invention, reference may be had to the following description and accompanying drawings, wherein.

Figure 1:
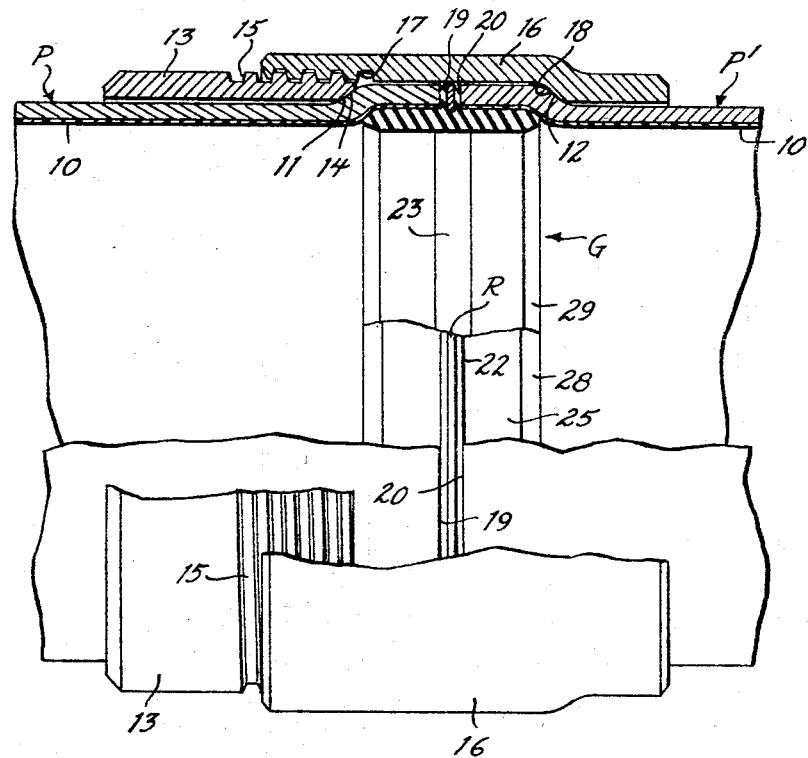
FIGURE 1 is a view of a pipe coupling including the self sealing gasket of this invention. In this view a portion of the coupling and pipe together with the gasket are broken away and shown in sections.

Referring now to the drawings and first more particularly to FIGURE 1, one type of the pipe joint with which the self sealing gasket of this invention may be utilized is therein illustrated. As mentioned above, however, this particular type of joint is not to be considered a limitation on the invention because the gasket will find utility in other joints.

FIGURE 1 shows two pipes ends P and P' which in the present instance are light wall pipe. The bores of the pipe P and P' are coated with a plastic lining 10. Each of the pipes P and P' is enlarged adjacent its free end to provide shoulders at 11 and 12. A sleeve 13 is fitted over the pipe P and has a conical shoulder 14 which engages the shoulder 11. This sleeve 13 is exteriorly threaded as indicated at 15.

A coupling member 16 is interiorly threaded as indicated at 17 and these threads mesh with the threads 15. The coupling member 16 has an internal shoulder at 18 which engages the shoulder 12 on the pipe P'. Obviously, the coupling members 13 and 16 may be relatively rotated and due to the threaded connections 15 and 17 will be drawn together. It is further noted that the pipe P has an end face at 19 and the pipe P' an end face at 20.

A gasket which is referred to in its entirety by the reference character G is included in the manner now to be described and this gasket is of the self sealing type.

Referring now more particularly to FIGURES 2 to 5 inclusive, it is first noted that the gasket G is of rubber or a comparable elastomer material which is susceptible of being molded or vulcanized. The gasket G includes a central rib or flange 22 and when in a free or unconfined condition there is a cylindrical surface at 23 opposite the flange 22. Between this flange 22 and surface 23 there is a portion 24 which is identified as the central portion of the gasket. Integrally joined to this central portion 24 and extending axially outwardly therefrom at one side, is a flared extension 25 defined by an outer frusto-conical surface 26 and an inner conical surface 27. This flared extension 25 terminates in a lip defined by conical surfaces 28 and 29.

At the other side of the central portion 24 and integrally joined thereto is a second flared extension 30 having the same structural characteristics as those described in connection with extension 25.

Figure 7:
FIGURE 7 is a side view of the ring of FIGURE 6 being taken on the planes normal thereto as represented by the line 7—7 of FIGURE 6.
Figure 6:
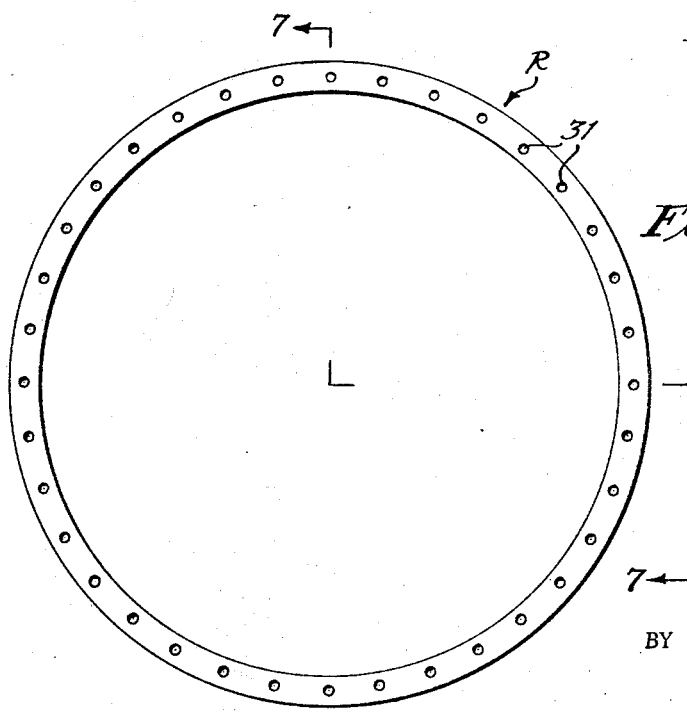
FIGURE 6 is an elevation of the reinforcing ring per se.
Figures 2, 3, 4, 5:
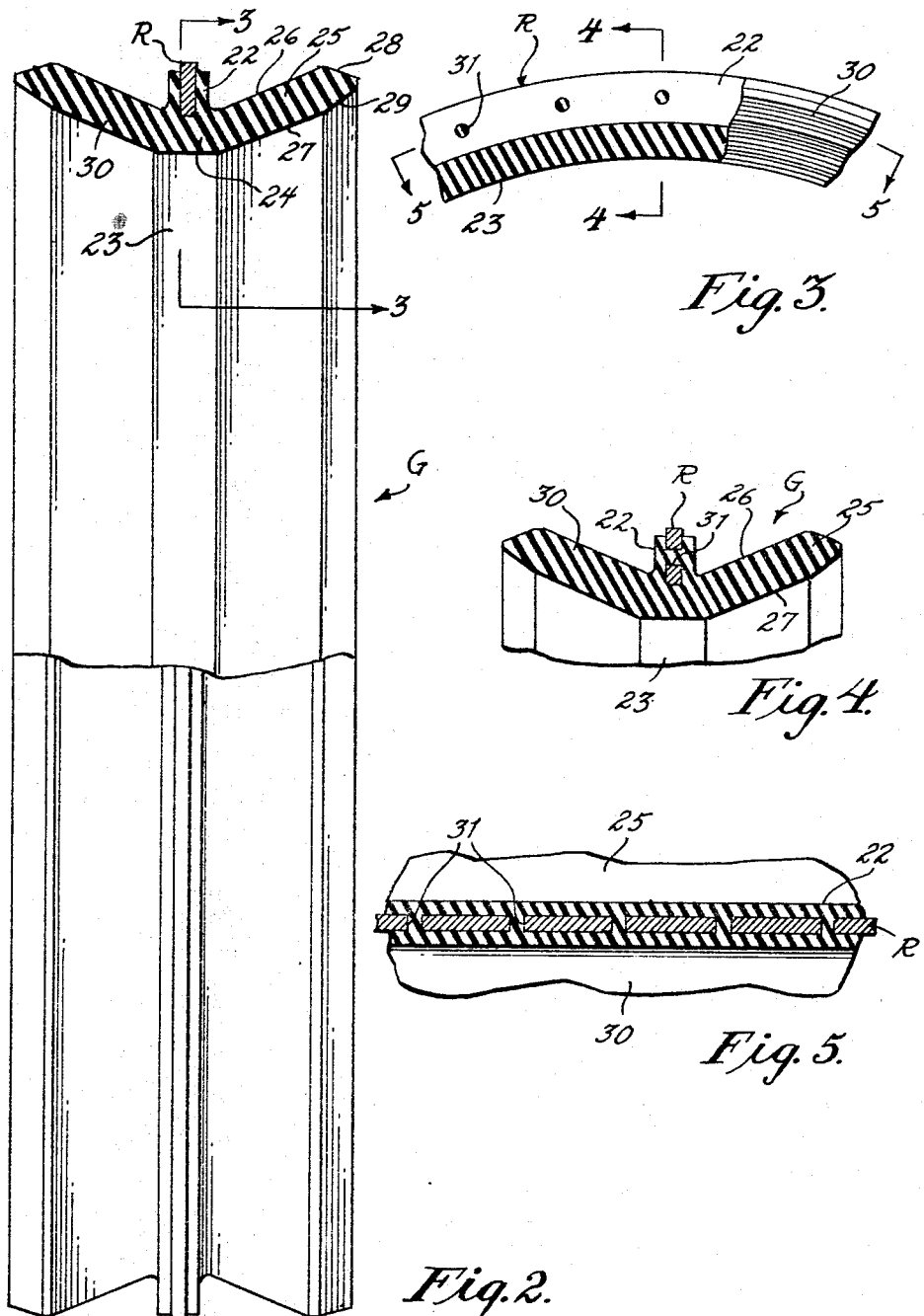
FIGURE 2 is a view taken on an enlarged scale of the gasket per se with parts broken away and shown in section.
FIGURE 3 is a detailed section through a portion of the gasket being taken about on the plane represented by the line 3—3 of FIGURE 2.
FIGURE 4 is another detailed section taken about on the plane represented by the line 4—4 of FIGURE 3.
FIGURE 5 is still another detailed section taken about on the plane represented by the line 5—5 of FIGURE 3.

A metallic reinforcing ring is shown in detail in FIGURES 6 and 7 and referred to in its entirety by the reference character R and is made of any appropriate metal having the required properties of strength and rigidity and is formed with a series of apertures 31. This ring R is embedded in the central flange 22 in the manner depicted in FIGURES 2 to 5 inclusive. When so embedded the rubber of the gasket occupies the aperture 31 and provides a good mechanical interlock or bond between the ring R and the flange 22 of the gasket. Obviously, this structural arrangement may be readily achieved by establishing the interlock as the gasket G is vulcanized or molded.

*Operation*

While the manner in which the self sealing gasket of this invention functions is believed to be obvious from the illustration on the drawings and description of the parts given, it may be briefly outlined as follows:

The gasket G is dimensioned with respect to the pipes P and P' so that about 6% compression will be required to insert the extensions 25 and 30 into the pipe P' and P respectively. The diameter of the cylindrical surface 23 will be substantially the same that it is intended to have in the assembled joint.

As the extensions 25 and 30 are compressed to achieve their insertion into the pipe ends, the reinforcing ring R holds and maintains the diameter of the central portion 24 of the gasket. Thus, there is no collapse or compression of the central portion. At the same time, additional compressive force is applied to those portions of the extensions which engage the bore of the pipe. After insertion has been accomplished, the surface at 26 on the extensions which were conical in the free condition of the gasket, are transformed into substantially cylindrical surfaces which engage with cylindrical bores of the pipe ends. This engagement takes place with greater compressive force at the zones adjacent to the ends of the extensions. Thus, there is surface contact which provides a good initial seal. With this surface contact obtaining it is utterly impossible for any of the line content to get in back of the gasket where it would neutralize the pressure of the line content. At the same time, the rubber on the exposed bores of the rib 22 by engaging the pipe ends 19 and 20 provides a supplemental seal which is particularly important should there be a tendency for a vacuum condition to be created.

After the joint in assembled and the pressure of the line content becomes effective, the additional pressure forces the extensions 25 and 30 into even better sealing engagement with the bore of the pipe.

While a preferred specific embodiment of the invention is hereinbefore set forth, it is to be clearly understood that the invention is not to be limited to the exact constructions, materials, or devices illustrated and described because various modifications of these details may be provided in putting the invention into practice within the purview of the appended claims.

What is claimed is:

1. A pipe joint assembly, comprising a pair of aligned cylindrical pipe ends having their edges in confronting relation and an annular elastomeric gasket ring having integral extensions projecting axially into engagement with the internal surfaces of both pipe bores, said extensions having substantially parallel frustro-conical inner and outer surfaces diverging radially outwardly from a central portion when in the unstressed, unconfined condition, each of said outer surfaces having an outside diameter at said central portion which is substantially the same as the inside diameter of the pipe bore and an outside diameter at its outer end which is considerably greater than said inside diameter of the pipe bore, whereby the inherent resilience of the gasket is initially intended to deform and press said outer surfaces into complete sealing contact with the pipe bores, and a integral flange projecting outwardly from said central portion and disposed between said confronting edges of the pipe ends, the radially inward section of the gasket having an axial length at least as great as said flange, the radial and axial lengths of said flange and said section defining a zone, and a substantially non-deformable rigid ring structurally secured to said gasket within said zone, said ring being so dimensioned and located in said zone to positively maintain the diameter of the gasket fixed against inherent forces tending to collapse the central portion, the average cross-sectional thickness of said extensions for a substantial portion of their length and the cross-sectional thickness of said central portion of the gasket all being substantially the same, thereby to insure the initial flat sealing contact of said outer surfaces within the pipe bores.

2. A pipe joint assembly according to claim 1, wherein said ring is embedded within the elastomeric material forming the gasket.

3. A pipe joint assembly according to claim 1, wherein said ring is embedded within said flange.

References Cited by the Examiner

UNITED STATES PATENTS

| | | | |
|---|---|---|---|
| 1,978,019 | 10/1934 | Haushalter | 285—110 X |
| 2,403,364 | 7/1946 | Hertzell | 285—370 X |

FOREIGN PATENTS

| | | |
|---|---|---|
| 231,098 | 3/1925 | Great Britain. |
| 566,329 | 12/1944 | Great Britain. |
| 752,395 | 7/1956 | Great Britain. |

CARL W. TOMLIN, *Primary Examiner.*

R. GIANGIORGI, *Assistant Examiner.*